United States Patent [19]

Chaconas

[11] 4,386,545

[45] Jun. 7, 1983

[54] ALINEMENT AND SUPPORT MEANS FOR GUIDING PULLEY OF BAND SAW

[75] Inventor: Peter C. Chaconas, Glyndon, Md.

[73] Assignee: Black & Decker Inc., Newark, Del.

[21] Appl. No.: 290,941

[22] Filed: Aug. 7, 1981

[51] Int. Cl.³ .................... B27B 13/08; B23D 55/10
[52] U.S. Cl. ....................................... 83/817; 83/818; 83/816; 83/814
[58] Field of Search ............... 83/818, 817, 816, 814, 83/574; 30/380

[56] References Cited

U.S. PATENT DOCUMENTS

| | | | |
|---|---|---|---|
| 2,180,501 | 11/1939 | Blood | 200/172 |
| 2,274,923 | 3/1942 | Hedgpeth | 83/817 |
| 2,380,700 | 7/1945 | Lasar | 83/817 |
| 2,463,437 | 3/1949 | Steiner | 83/818 |
| 2,625,964 | 1/1953 | Green et al. | 83/547 |
| 2,798,518 | 7/1957 | Gray | 83/547 |
| 2,825,369 | 3/1958 | Karp et al. | 83/818 |
| 2,969,815 | 1/1961 | Lasar | 83/818 |
| 3,390,598 | 7/1968 | Sands et al. | 83/817 |
| 3,602,662 | 8/1971 | Haller | 200/61.62 |
| 3,961,550 | 6/1976 | Oliver et al. | 83/574 |
| 4,107,484 | 8/1978 | Petersen, III | 200/42 R |
| 4,356,750 | 11/1982 | Legler et al. | 83/818 X |

FOREIGN PATENT DOCUMENTS

| | | | |
|---|---|---|---|
| 130911 | 4/1947 | Australia | 83/817 |

*Primary Examiner*—Donald R. Schran
*Attorney, Agent, or Firm*—Harold Weinstein; Ronald Sherer

[57] ABSTRACT

An elongated stamped sheet-metal slider member facilitates the alinement and support for the guiding pulley of a band saw. The slider member has several integrally-formed portions. A first portion depends within the housing, and the pulley is rotatably supported thereon about an axis substantially perpendicular thereto. A second portion of the slider member is bent away, forming an obtuse angle with the first portion, and extends through a slotted opening formed in the housing. This second portion has a pair of ears projecting laterally of the slotted opening for preventing the slider from passing completely into the housing. The ears have respective side edge portions engaging the outer surface of the housing and forming therebetween a fulcrum for pivotal movement of the slider member and hence the pulley about an axis which is above the pulley axis and transverse thereto. A jack screw is carried by the housing for engaging the first portion of the slider member below the pulley axis. Movement of the jack screw pivots the slider member and hence the pulley about the pivot axis of the slider member, thereby facilitating an alinement of the guiding pulley. A third portion of the slider member is bent back into the housing above the fulcrum and within a plane substantially at right angles to the plane of the first portion of the slider member. A cap screw is secured at its lower end of the third portion of the slider member, and the head of the cap screw is captured by a tensioning knob for supporting the slider and hence the pulley within the housing. By means of the tensioning knob and cap screw, the slider member may be raised and lowered vertically within the housing, and thus the pivot axis of the slider member will be adjusted vertically. In addition, a suitable spring is provided to tension the assembly and hence the guiding pulley, and as a result the pivot axis of the slider member will float along the outer surface of the housing.

17 Claims, 5 Drawing Figures

ALINEMENT AND SUPPORT MEANS FOR GUIDING PULLEY OF BAND SAW

BACKGROUND OF THE INVENTION

Various types of machinery or power-driven tools, such as a band saw, employ a driving pulley and a driven pulley. The driving pulley is connected to a motor, and the driven pulley guides the saw band or a similar implement for movement between the pulleys. Means are provided for supporting the driven guiding pulley and for properly tensioning the saw band between the pulleys; and further means are provided for pivoting the guiding pulley about an axis transverse to its rotational axis, thereby facilitating an alinement of the guiding pulley and hence the saw band. In the prior art, of which I am aware, the supporting and alinement means have been generally adequate for the purposes intended, but mostly have been relatively sophisticated or complicated mechanisms and hence expensive to produce and difficult to assemble. In addition, the supporting and alinement means resorted to in the prior art do not offer the desired degree of lateral support consonant with an inexpensive mechanism for high-volume power tools intended for consumer usage.

SUMMARY OF THE INVENTION

It is an object of the present invention to provide, for use with a band saw or the like, an improved alinement and support means for the guiding pulley, which improved means is simple and convenient to use, economical to fabricate and to assemble within the machine, and reliable in its operation.

It is another object of the present invention to provide a simple and inexpensive means for the required lateral support of the alinement and support means for the guiding pulley, the lateral support precluding a twisting of the alinement means relative to the housing for the machine.

In accordance with the broad teachings of the present invention, an elongated slider member has a first portion within the housing and disposed in a plane transversely of the pulley axis, and the pulley is rotatably supported thereon. The slider member has an integral second portion bent away from the pulley at an obtuse angle with respect to the first portion of the slider member. The housing has a side wall with an opening formed therein, and the second portion of the slider member extends through the opening and has a portion externally of the housing. This external portion has means for engaging the outer surface of the housing wall for forming therebetween a fulcrum for pivotal movement of the slider member. This pivotal movement of the slider member is about an axis which is in a plane generally perpendicular to the plane of the pulley axis. A jack screw is carried by the housing wall and extends within the housing for engaging the first portion of the slider member, below the pulley axis. The jack screw pivots the slider member about its axis, thereby facilitating an alinement of the guiding pulley. The slider member further has a third portion, which is integral with the external portion and is bent thereto. This third portion extends back through the opening in the housing wall and into the housing along a plane substantially at right angles to the plane of the first portion of the slider member. The support and tensioning means for the guiding pulley includes an elongated cap screw extending from the top of the housing and between the pulley and the housing wall; and the lower portion of the cap screw is secured to the third portion of the slider member.

In accordance with the further teachings of the present invention, the slider member comprises a stamped sheet-metal member positioned in a slotted opening in the housing wall and extending into the housing. The slider member has a pair of laterally-projecting ears, one on each side of the slotted opening in the housing wall. The ears thereby prevent the slider member from passing completely through the slotted opening. The ears have respective lower edge portions engaging the outer surface of the housing wall and forming therebetween a fulcrum for pivotal movement of the slider member. The slider member is free to pivot about an axis which substantially joins the respective lower edge portions of the ears and is generally perpendicular to the axis of the guiding pulley. Because of the support and tensioning means for the pulley, the pivot axis of the slider member is adjustable vertically and in any adjusted position, is free to float slightly along the outer surface of the housing wall.

These and other objects of the present invention will become apparent from a reading of the following specification, taken in conjunction with the enclosed drawings.

DETAILED DESCRIPTION

Figure 1:
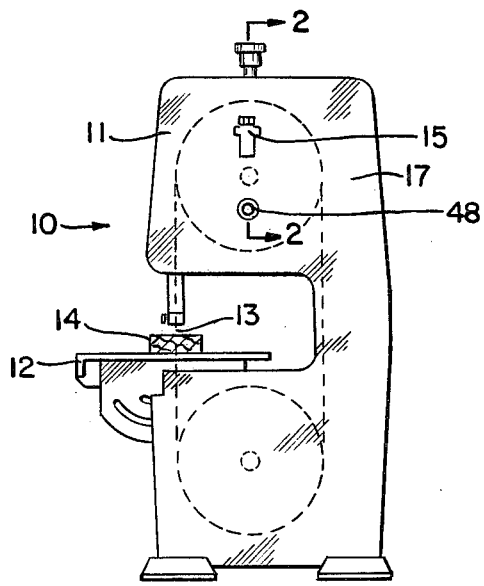
FIG. 1 is a front elevation of a band saw with which the teachings of the present invention may find particular utility.

With reference to FIG. 1, there is illustrated a band saw 10 with which the teachings of the present invention may find particular utility. It will be understood by those skilled in the art that the teachings of the present invention may be applied to other tools having a driving pulley powered by a motor and a driven pulley for guiding a saw band, sanding belt or other similar implement between the pulleys. With this in mind, the band saw generally comprises a housing 11, a table 12, and a saw band 13 revolving between the pulleys for cutting a workpiece 14. The motor and driving pulley, being conventional, have been omitted for ease of illustration.

With reference to the remaining drawings, a slider member 15 is positioned in a slotted opening 16 formed in a wall 17 of the housing. Preferably, the slider member comprises an elongated bent stamped sheet-metal piece having a number of respective integral portions.

A first portion 18 of the slider member depends downwardly therefrom between the housing wall and the guiding pulley 19, and substantially at right angles to the axis 20 of the pulley. A shoulder bolt 21 has a head 22 and a threaded end 23 extending through a hole 24 in the slider member for receiving a nut 25. The bolt has a smooth cylindrical body portion 26 for rotatably journaling the hub 27 of the guiding pulley. The pulley hub is provided with a sleeve bearing 28 and may be provided with a washer 29, if desired. The pulley has a web portion 30 joining the hub with its circumferential portion 30a upon which the saw band (not shown) is mounted.

Figure 2:
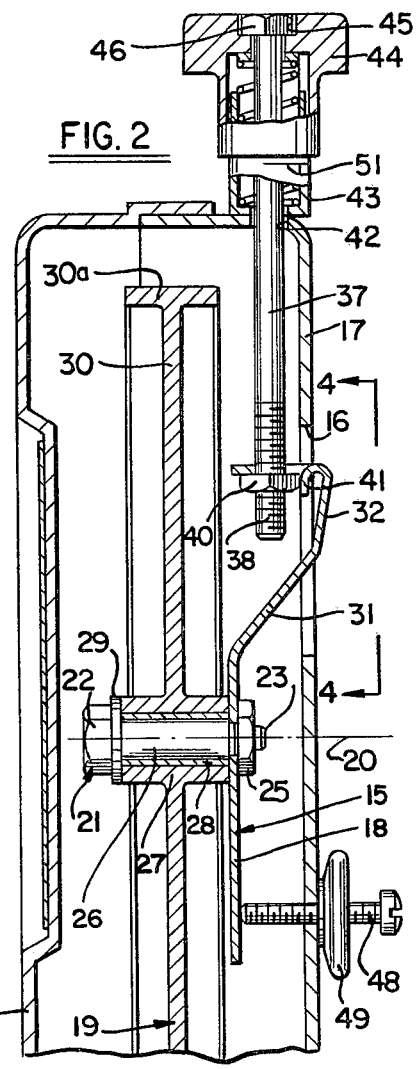
FIG. 2 is a longitudinal section, taken along the lines 2—2 of FIG. 1 and drawn to an enlarged scale, and showing a preferred embodiment of the alinement and support means of the present invention.
Figure 3:
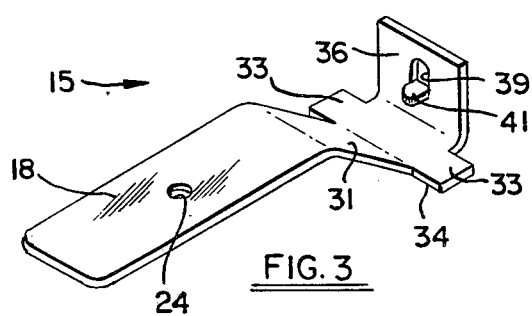
FIG. 3 is an isometric or pictorial view of the stamped sheet-metal slider member of the present invention, the slider supporting the pulley and having a pivotal movement for alinement of the pulley axis.

The slider member 15 further has an integral second portion 31 bent away from the pulley and disposed at an obtuse angle with respect to the first portion 18 of the slider member, as shown more clearly in FIGS. 2 and 3. The second portion 31 of the slider member extends through the opening 16 in the housing wall and has a portion 32 thereof externally of the housing.

Figure 4:
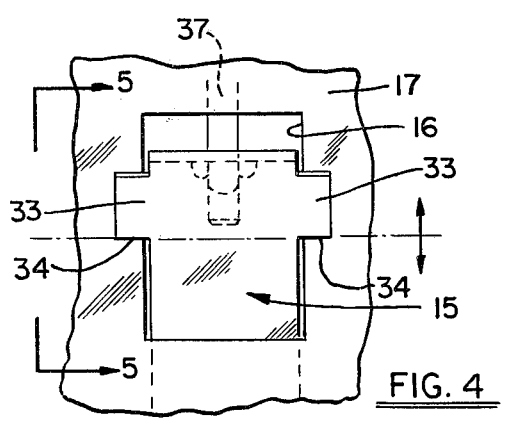
FIG. 4 is a view, taken along the lines 4—4 of FIG. 2, showing the slider member positioned in a slotted opening in the housing wall, and further showing a pair of laterally-projecting ears integrally formed on the slider to prevent the slider from passing completely through the wall and into the housing.
Figure 5:
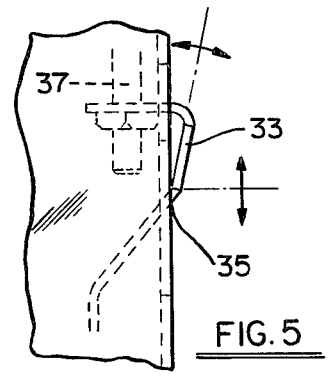
FIG. 5 is a view, taken along the lines 5—5 of FIG. 4 and drawn to an enlarged scale, showing the manner in which the respective side edges of the ears form a fulcrum for pivotal movement of the slider member.

The external portion 32 of the slider member 15 has a pair of laterally-projecting ears 33 which serve a three-fold purpose. First, the ears prevent the slider member from passing completely through the slotted opening in the wall and into the housing, as shown more clearly in FIG. 4. Secondly, the ears have respective side edge portions 34 engaging the outer surface of the housing wall and forming therebetween a fulcrum 35, as shown in FIG. 5, for pivotal movement of the slider member. The axis of the pivoted slider substantially joins the respective side edge portions 34 of the ears 33, and is substantially perpendicular to the axis of the guiding pulley (and in the preferred embodiment, above the pulley axis) as shown more clearly in FIG. 2. Thirdly, the ears provide for improved lateral support of the slider member (and the components secured thereto) against a twisting movement.

The slider member 15 has a third portion 36 integral with the external portion 32 and bent thereto. This third portion 32 of the slider member extends back through the opening 16 in the housing wall and into the housing along a plane substantially at right angles to the plane of the first portion 18 of the slider member.

The supporting and tensioning means for the pulley includes an cap screw 37 which, as shown in FIG. 2, extends from the top of the housing between the pulley and the housing wall. The cap screw 37 has a lower end 38 passing through a hole 39 in the third portion of the slider member to receive a nut 40, thereby securing the cap screw to the slider member. A lanced-out tab 41 is lodged against the nut and prevents the nut from turning. The cap screw 37 extends through a hole 42 in the housing wall and is received within a metering cup 43 mounted on top of the housing. A tensioning knob 44 is received over the metering cup 43 and has a recessed hexagonal portion 45 for receiving the corresponding hexagonal head 46 of the cap screw. A coil spring 47 is seated axially between the metering cup and the tensioning knob (around the cap screw) for tensioning the assembly. Turning the tensioning knob will raise or lower the slider member and the guiding pulley carried thereby to take up the slack in the saw band and then to compress the spring for tensioning the assembly. The outer surface of the metering cup may be provided with suitable indicia, one of which is shown as at 51, for the desired minimum and maximum degrees of tensioning.

The alinement means for the guiding pulley comprises a jack screw 48 threadably carried by the housing wall and retained by a jam nut 49, as shown in FIG. 2. The screw extends within the housing and engages the depending first portion 18 of the slider member. The screw pivots the slider member about its fulcrum or pivot axis 35, which is generally perpendicular to the axis of the guiding pulley. With this arrangement, the pulley axis may be properly adjusted for alinement and smooth operation and tracking of the saw band.

The supporting means may raise or lower the pivoted slider member (and hence the guiding pulley) within the housing, so as to compensate for variations in the dimensions of saw bands of different manufacturers, or to compensate for tolerance accumulations in the manufacture and assembly of the band saw. As a result, the pivot axis of the slider member will be adjusted vertically with respect to the outer surface of the housing wall. In a preferred embodiment, the amount of vertical movement is a maximum of approximately three-quarters of an inch. Additionally, because of the tensioning spring and any run-out of the respective pulleys, the pivot axis of the slider member will tend to float along the outer surface of the housing wall.

In the assembly of the components of the present invention, the slider member 15 is first slipped through the slotted opening 16 in the housing wall until the ears 33 of the slider engage the outer surface of the wall. Next, the cap screw is slipped into the housing and secured to the integral third portion 36 of the slider member. The slider member may then be pivoted so that the pulley 19 may be secured to the depending first portion 18 of the slider member. When all of the components are assembled together, and the saw band (not shown) is positioned over the pulleys, the cover 50 is secured to the housing wall.

In summary, the pivoted stamped sheet-metal slider of the present invention facilitates a convenient, reliable, economical means for alining and supporting the guiding pulley within the band saw. Additionally, the projecting ears on the slider member, which engage the housing wall on respective sides of the slotted opening, provide good lateral stability for the slider member and the other components of the alinement and support means for the guiding pulley.

Obviously, many modifications may be made without departing from the basic spirit of the present invention. For example, it will be understood by those skilled in the art that the respective side edge portions 34 of the laterally-projecting ears may be rounded off or curved slightly to facilitate the pivoting movement of the slider member and its vertical adjustment and floating movement with respect to the outer surface of the housing wall. Accordingly, it will be appreciated by those skilled in the art that within the scope of the appended claims, the invention may be practiced other than has been specifically described herein.

I claim:

1. In a band saw having a housing with a guiding pulley therein, an alinement and support means for the pulley, comprising, in combination, an elongated slider member having a first portion within the housing and disposed in a plane transversely of the pulley axis, means for rotatably supporting the pulley on the first portion of the slider member, the slider member further having an integral second portion bent away from the pulley and disposed at an obtuse angle with respect to the first portion of the slider, the housing having a side wall with an opening formed therein, the second portion of the slider extending through the opening and having a portion externally of the housing, the external portion of the slider member having means engaging the outer surface of the housing wall and forming therebetween a fulcrum for pivotal movement of the slider member and hence the pulley about an axis generally perpendicular to the pulley axis, a jack screw carried by the wall of the housing and extending within the housing for engaging the first portion of the slider member for pivoting the slider member, thereby facilitating an adjustment of the pulley axis, the slider member further having a third portion integral with the external portion and bent thereto, the third portion extending back through the opening in the housing wall and into the housing along a plane substantially at right angles to the plane of the first portion of the slider member, and supporting means for the pulley, the supporting means including screw means extending from the top of the housing, the screw means having a lower end portion secured to the third portion of the slider member.

2. The combination of claim 1, wherein the slider member comprises a stamped sheet-metal piece.

3. The combination of claim 1, wherein the supporting means further includes a metering cup seated on top of the housing, and wherein a tensioning knob is fitted over the metering cup.

4. The combination of claim 3, wherein the screw means comprises an elongated cap screw received concentrically within the metering cup, and means keying the cap screw to the tensioning knob.

5. The combination of claim 4 wherein the keying means comprises a hexagonal head on the cap screw, the head being received in a hexagonal recess formed in the tensioning knob.

6. The combination of claim 3 further including indicia on the outer surface of the metering cup.

7. The combination of claim 3, further including a coil spring around the screw means, the spring being seated axially between the metering cup and the tensioning knob.

8. The combination of claim 1, wherein the third portion of the slider member has a depending tab, and wherein a nut is lodged against the tab and is threaded to the end of the screw means.

9. The combination of claim 1, wherein the means for mounting the pulley on the first portion of the slider member comprises a shoulder bolt having a cylindrical portion received in a bushing in the pulley hub, the bolt having a headed portion at one end and further having a threaded end portion, the first portion of the slider member having a hole for receiving the threaded end of the bolt, and a nut threaded thereon.

10. The combination of claim 1, wherein the axis of the guiding pulley is substantially at right angles to the plane of the first portion of the slider member.

11. The combination of claim 1, wherein the jack screw engages the first portion of the slider member below the pulley axis.

12. The combination of claim 11, further including a jam nut for the jack screw.

13. The combination of claim 1, wherein the means engaging the outer surface of the housing comprises a pair of ears formed integrally with the slider member and projecting laterally therefrom.

14. In a band saw or other power-driven apparatus of the type having a housing with a housing wall and a guiding pulley in the housing, an alinement and support means for the pulley, comprising, in combination, a stamped sheet-metal elongated slider member positioned in a slotted opening in the housing, the slider member having a pair of laterally-projecting ears, one on each side of the slotted opening, the ears preventing the slider member from passing completely through the slotted opening and into the housing, and the ears having respective lower edge portions engaging the outer surface of the housing wall and forming therebetween a fulcrum for pivotal movement of the slider about an axis substantially joining the respective lower edge portions of the ears, means for supporting the pulley on the slider member within the housing for rotation of the pulley about an axis generally perpendicular to the pivot axis of the slider member, means for pivoting the slider member about its axis for adjusting the axis of the guiding pulley, and means carried by the housing for supporting the slider member and hence the guiding pulley within the housing.

15. The combination of claim 14, wherein the supporting means for the pulley includes an elongated cap screw secured to a portion of the slider member within the housing, and means cooperating with the cap screw for raising and lowering the slider member within the housing, whereby the pivot axis of the slider member will be raised or lowered with respect to the outer surface of the housing.

16. Alinement and support means for a guiding pulley disposed in the housing of a power-operated apparatus, comprising a member received through an opening in the housing and extending within the housing, means for supporting the pulley on the member for rotational movement of the pulley about its axis, means carried by the housing for supporting the member and hence the pulley within the housing, means for preventing the member from passing completely through the opening and into the housing, said last-named means including laterally-projecting means engaging the outer surface of the housing wall and forming therebetween a fulcrum for pivotal movement of the member about an axis generally perpendicular to the pulley axis, the pivot axis of the member being adjusted along the outer surface of the housing wall in accordance with the relative position of the supporting means, and means carried by the housing for engaging the member and pivoting the member about its axis, thereby facilitating an adjustment of the pulley axis.

17. The alinement and support means of claim 16, wherein the laterally-projecting means includes means for preventing a twisting movement of the member.

* * * * *